May 18, 1965    D. C. ENGLAND    3,184,286
$Cs_2B_{12}H_{12}CsNO_3$ PRODUCT AND PROCESS FOR MAKING SAME
Filed Feb. 17, 1961
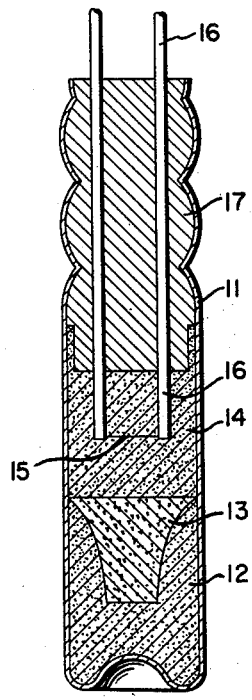
INVENTOR
DAVID C. ENGLAND
BY Bertram J. Rowland
AGENT

United States Patent Office 3,184,286
Patented May 18, 1965

3,184,286
$Cs_2B_{12}H_{12} \cdot CsNO_3$ PRODUCT AND PROCESS
FOR MAKING SAME
David C. England, Wilmington, Del., assignor to E. I.
du Pont de Nemours and Company, Wilmington, Del.,
a corporation of Delaware
Filed Feb. 17, 1961, Ser. No. 90,012
4 Claims. (Cl. 23—14)

This invention relates to a novel compound which contains boron and to the preparation of this compound. More particularly, the invention relates to a double salt which contains boron and to methods for its preparation.

A need exists for compositions which will yield large quantities of energy under controllable conditions. In recent years boron compounds have been considered for use in this field but many of the available boron compounds are severely limited in use because of hydrolytic, oxidative and other types of instability. Compositions which will provide maximum energy when desired and which have good stability in other respects form a valuable and needed class of products particularly in the field of explosives and high energy fuels.

The composition of the present invention is a double salt of cesium nitrate and cesium dodecahydrododecaborate($2-$) in which the nitrate and dodecahydrododecaborate($2-$) components are present in equimolar ratios. The composition is represented by the formula

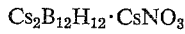

In this formula, the group $B_{12}H_{12}$ is referred to as "dodecahydrododecaborate($2-$)" or, more simply, "dodecahydrododecaborate." This group has a negative valence of two, i.e., in reactions it behaves as a divalent anion.

The compound of the invention is a crystalline solid which is substantially white or colorless. It can be stored for indefinite periods in conventional containers, preferably of corrosion-resistant materials. Containers of glass, polyethylene, poly(tetrafluoroethylene) resin, and the like are suitable. The compound is soluble in highly polar liquids such as water. It has only limited solubility in alcohols, esters, ethers, ketones, and the like. The compound is substantially insoluble in hydrocarbons and has reasonably god thermal stability, e.g., the cesium double salt is stable to high temperatures in the absence of an open flame. When exposed to an open flame, the compound burns readily.

The double salt of the invention is obtained by reacting compounds which contain one or more of the anion and cation-forming groups found in the final product. Thus, three reactants can be employed, if desired, which are (1) a dodecahydrododecaborate($2-$), i.e., a compound containing the $B_{12}H_{12}^=$ group, (2) a compound having a nitrate group ($NO_3^-$), and (3) a salt of cesium. Preferably, water-soluble reactants are employed to facilitate separation of the desired product. In other words, by bringing together sources of the three components which are water-soluble, one may obtain the desired product.

Dodecahydrododecaborates($2-$) can be obtained by the process described by Pitochelli and Hawthorne, J. Am. Chem. Soc., 82, 3229 (1960). A general method for the preparation of a typical salt, $Na_2B_{12}H_{12}$, is also described in a subsequent paragraph. In the event other salts are desired, they can be obtained from $Na_2B_{12}H_{12}$ by simple mathematical reactions. Dihydrogen dodecahydrododecaborate($2-$), i.e., $H_2B_{12}H_{12}$, if desired as a reactant, can be obtained in water solution by contacting an aqueous solution of $Na_2B_{12}H_{12}$ with the acid form of an ion-exchange resin. Suitable acidic ion-exchange resins are the polysulfonic acid resins which are commercially available, e.g., "Amberlite IR-120 (H)" and "Dowex 50." The aqueous solution of $H_2B_{12}H_{12}$ probably contains the hydronium ion ($H_3O^+$).

Any dodecahydrododecaborate is operable in the process. However, as a matter of convenience water-soluble dodecahydrododecaborates are preferred. Especially preferred dodecahydrododecaborates are represented generically by the following fomula:

where M' is hydrogen, ammonium ($NH_4$), substituted ammonium ($R_2R'NH$ and $R'_4N$), or alkali metal. In the substituted ammonium group, R is hydrogen or R', and R' represents a hydrocarbon group of up to 8 carbons which can be alkyl, cycloalkyl, aryl, alkaryl, and aralkyl. Illustrative of R' are the groups methyl, ethyl, octyl, cyclohexyl, phenyl, benzyl, and the like. The nature of these groups is not a critical factor in the process.

The nitrate-bearing reactant can, as the same implies, be any compound which supplies a nitrate ion ($NO_3^-$). The compounds which are most readily available are generally employed as a matter of convenience. These are nitric acid and alkali metal nitrates (e.g., $NaNO_3$ $KNO_3$ and $CsNO_3$) which are preferably used in solution. These compounds form a preferred group of reactants which can be represented generically as $M''NO_3$, where $M''$ is hydrogen or an alkali metal. Caution is necessary when nitric acid is used as a reactant to avoid a vigorous reaction and for its reason, it is preferable to dilute concentrated nitric acid with an equal volume of water prior to use. Cooling of the reaction mixture to about 25° C. or lower aids in controlling the reaction.

The third reactant supplies the desired cesium which appears in the final product. This reactant need not be employed in cases where at least one of M' and M" in the two previous reactants is cesium. In the event the third reactant is employed, any available salt can be used which provides the desired cation-forming group. Thus, halides, carbonates, sulfates, phosphates, hydroxides, and the like, of cesium, can be used. To illustrate, cesium hydroxide, cesium fluoride, cesium sulfate, cesium phosphate, and like compounds can be employed.

The process is generally conducted in an inert liquid medium which is a solvent for the reactants. Water is entirely satisfactory as a reaction medium and it is a preferred solvent in view of its availability and ease of handling.

In the simplest mode of operation, an aqueous solution of cesium dodecahydrododecaborate is added with stirring to an aqueous solution of cesium nitrate. The reaction mixture is concentrated, if necessary, by evaporation until the double salt precipitates. Frequently, the double salt precipitates at once and it is separated by filtration. In this mode of operation, temperature is not a critical factor. The reaction is normally operated at prevailing atmospheric temperature (about 25° C.) but lower or higher temperatures can be employed, e.g., from about —20° to 100° C. Concentration of reactants in solution is not critical, i.e., dilute or concentrated solutions can be used. However, by using solutions of maximum concentration, the double salt will usually precipitate at once. To obtain products which can be purified with minimum effort, it is preferred that the ratio, moles of nitrate/moles of dodecaborate, is at least 3 and that the same metal anion, i.e., cesium is present in each reactant. The process is operable even though these reactants are used in a molar ratio of less than 3.

In a modification of the above method of operation, cesium dodecahydrododecaborate is dissolved in an aqueous solution of cesium nitrate to provide a solution which can be processed as described in the preceding paragraph.

In a second mode of operation, an aqueous solution of the dodecahydrododecaborate is prepared and an aqueous solution of nitric acid is added with stirring to the reaction mixture which, preferably, is cooled. The resulting solution is mixed with a cesium salt. The salt most conveniently used is the nitrate and, in the event another salt is used, e.g., a chloride, fluoride, sulfate, and the like, sufficient nitric acid is employed initially to provide the quantity of nitrate ion needed to form the cesium nitrate and to react with the M' group in $M'_2B_{12}H_{12}$. Thus, in a preferred method of operation of this process, the moles of cesium salt which are used are greater than the sum of the moles of dodecahydrododecaborate and moles of nitrate. It is not essential for operability that this ratio is used.

The concentration of nitric acid in the aqueous solution employed as a reactant is generally at most 70% and it is preferably lower. When a solution of high concentration of nitric acid is employed the reaction is generally performed at a relatively low temperature. Preferably a temperature of not over about 50° C. is employed. A satisfactory and preferred temperature range is from about —20° to 30° C.

The product is purified by conventional methods. The product can be washed with oxygen-containing liquids, e.g., acetone, 1,2-dimethoxyethane, ethyl acetate, ethyl alcohol, and the like, and it can be recrystallized from suitable solvents. In view of the solubility of the double salt in water, particularly hot water, this solvent is most frequently used as a recrystallizing medium.

Modifications of the above processes can be employed to obtain the double salt. Thus, an aqueous solution of the free dodecahydrododecaborate acid [represented as $H_2B_{12}H_{12}$ or, in its hydronium form, as $(H_3O)_2B_{12}H_{12}$] can be admixed with nitric acid and then with a cesium salt. The free dodecahydrododecaborate acid reactant is obtained, as stated previously, by treating at temperatures between 0° and 100° C. an aqueous solution of a metal or ammonium dodecahydrododecaborate with an ion-exchange resin capable of replacing the metal or ammonium group by hydrogen, e.g., polystyrene cross-linked with divinyl benzene which is sulfonated to introduce sulfonic acid groups into the aryl nucleus. The free boron acid reactant can be isolated, if desired, by evaporating the aqueous acid solution at about 50° C. or below, preferably under reduced pressure (10 mm. of Hg or less). The acid is usually and most conveniently obtained as a hydrate.

The preparation of the double salt of the invention is illustrated in further detail in the following example. The preparation of a typical dodecahydrododecaborate, used as one reactant, is also described (Example A).

*Example A*

(A) A pressure vessel (capacity, 400 ml.) is charged with 19.0 g. of sodium hydroborate ($NaBH_4$) and 75 ml. of dry triethylamine. The vessel is cooled in a solid carbon dioxide-acetone bath and the internal pressure is reduced to less than 1.0 mm. pressure by means of a vacuum pump. Diborane (36.0 g.) is introduced into the vessel which is then closed. The mixture is heated with agitation for 10 hours at 180° C. After cooling the vessel and venting to remove volatile products, there remains a solid residue which is washed from the vessel with 1,2-dimethoxyethane (glyme). The solid is separated by filtration and it is again washed with glyme. The washed solid is dissolved in hot tetrahydrofuran and the solution is filtered to remove a small quantity of insoluble product. The filtrate is heated to boiling and glyme is added slowly until solid material begins to separate. The mixture is chilled and it is then filtered to separate the white crystals. These crystals are washed with glyme and dried at less than 0.001 mm. pressure at 90–100° C. to yield 43.9 g. of $Na_2B_{12}H_{12}$ containing glyme and water of solvation. Further treatment of the filtrate yields an additional 5.4 g. of the product.

(B) The product of Part A is recrystallized from a large quantity of diethyl ether to obtain a hydrate of $Na_2B_{12}H_{12}$, free of glyme as solvent of crystallization, i.e., the product is $Na_2B_{12}H_{12}$ containing water of crystallization.

The compound $Na_2B_{12}H_{12}$ is referred to as disodium dodecahydrododecaborate(2−).

*Example I*

(A) A reaction vessel is charged with 5 ml. of water and 1 g. of disodium dodecahydrododecaborate(2−) dihydrate ($Na_2B_{12}H_{12} \cdot 2H_2O$). The mixture is stirred to form a solution and the vessel is immersed in a cooling bath to maintain a temperature slightly below 0° C. A solution of 5 g. fuming nitric acid in 15 ml. of water is added dropwise and with vigorous agitation to the reaction mixture, keeping the temperature somewhat below 0° C. The mixture becomes red until about half of the nitric acid solution is added. The color of the solution then becomes yellow. After addition of the nitric acid is completed, the solution is stirred a few minutes in the cooling bath and, while still cold, 5 ml. of an aqueous 50% solution of cesium fluoride is added with stirring. The precipitate which forms is separated by filtration and the solid is washed thoroughly with cold water. The solid is crystallized from water containing an activated decolorizing carbon to yield 2.3 g. of dicesium dodecahydrododecaborate (2−)-cesium nitrate adduct. The product is further purified by recrystallization from water as described. The identity of the compound, which has the formula $Cs_2B_{12}H_{12} \cdot CsNO_3$, is confirmed by elemental analysis.

*Analysis.*—Calc'd for $Cs_3B_{12}H_{12}NO_3$: Cs, 66.2; B, 21.6; H, 2.0; N, 2.3. Found: Cs, 64.8, 65.9; B, 21.39, 21.48; H, 2.19, 2.31; N, 1.21, 1.04.

(B) A reaction vessel is charged with 25 ml. of water and 20 g. of disodium dodecahydrododecaborate(2−) which contains, as solvents of crystallization, about 1 mole of water and 3.5 moles of 1,2-dimethoxyethane. The mixture is stirred to form a solution and it is then cooled in an ice-water bath. A solution consisting of 5 ml. of 70% nitric acid in 10 ml. of water is added to the cooled reaction mixture slowly and with stirring. A faint reddish color develops initially but it fades rapidly. Cooling of the solution in the ice-bath is continued and 20 ml. of a 50% aqueous cesium fluoride solution is added with agitation. A white precipitate forms which is separated by filtration. The solid product is crystallized from water to yield 19 g. of dicesium dodecahydrododecaborate(2−)-cesium nitrate double salt, i.e., $Cs_2B_{12}H_{12} \cdot CsNO_3$. The identity of the compound is confirmed by its infrared absorption spectrum.

The process illustrated in the above example is operable generally with a wide range of dodecahydrododecaborate salts, i.e., with compounds represented generically as $M'_a(B_{12}H_{12})_b$, where $a$ and $b$ are whole numbers of 1 through 3 whose values are determined by the valence of M'. To illustrate, M' can be ammonium, substituted ammonium, hydrazonium or any metal which, preferably, yields a water-soluble dodecahydrododecaborate. These salts can be obtained by simple metathetic reactions from $Na_2B_{12}H_{12}$ in aqueous solution or by neutralization of the hydrated acid, $(H_3O)_2B_{12}H_{12}$, in aqueous solution with a base, or by other methods which are obvious to those skilled in the art. For example, neutralization of the acid with ammonium hydroxide yields $(NH_4)_2B_{12}H_{12}$; with cesium hydroxide, $Cs_2B_{12}H_{12}$ is obtained; with $$(C_2H_5)_4NOH$$

there is obtained $[(C_2H_5)_4N]_2B_{12}H_{12}$. It is thus evident that a wide range of salts can easily be obtained for use as reactants in the above-described processes for obtaining the double salt of the invention.

The double salt of the invention is particularly useful as an ignition agent in electric blasting caps. For example, in electric blasting caps to be used for special purposes, such as seismographic exploration, the accuracy of the

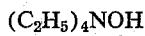

work is dependent upon knowledge of the instant of detonation. At present, lead styphnate is known to be highly sensitive to ignition by discharges of static electricity and, accordingly, must be handled with extreme caution.

The double salt of cesium nitrate with cesium dodecahydrododecaborate, i.e., $Cs_2B_{12}H_{12} \cdot CsNO_3$, has been found to be very insensitive to ignition by discharges of static electricity and, at the same time, to be ignitable with sufficient rapidity to meet the requirements of a "fast" ignition charge.

To evaluate the performance of this double salt, electric blasting caps are prepared having the design illustrated in the accompanying drawing. Referring to the drawing, the electric blasting cap comprises a shell 11 having an integral closed end. A base charge 12 is loaded adjacent to the end. Such base charge may consist of any explosive conventionally employed for the purpose, such as cyclotrimethylenetrinitramine, pentaerythritol tetranitrate, picric acid, trinitrotoluene, tetryl or mixtures thereof. Above base charge 12 is primer charge 13 which may be any of the primary explosives (highly sensitive to flame and/or shock) usually employed, e.g., lead azide or mercury fulminate. Above primer charge 13 is the loose igniting charge 14 which in this case consists of the double salt of cesium nitrate with cesium dodecahydrododecaborate. A bridgewire 15 connecting the termini of lead wires 16 is disposed within the ignition composition 14. The shell 11 is sealed with rubber plug 17 which also holds the lead wires 16 firmly in position. Alternatively, conventional shell sealing means may be substituted for the rubber plug 17.

*Example II*

(A) A series of electric blasting caps are assembled as described in the drawing. The shell is of bronze and is 1⅛ inches long with an outer diameter of 0.272 inch and an average inner diameter of 0.26 inch. Into this shell is loaded approximately 4.9 grains of pentaerythritol tetranitrate, pressed at 225–250 lb. Immediately above this base charge, approximately 2.2 grains of lead azide is loaded and pressed at about 200 lbs. Two grains of the loose double salt of cesium nitrate and cesium dodecahydrododecaborate is inserted as the ignition charge. A conventional rubber plug assembly is inserted in which a 0.0019 inch diameter 80/20 nickel chromium bridge wire is soldered to the lead wires separated to provide a ⅛ inch span and projecting ⅛ inch inch from the base of the rubber plug. The lead wires contained in the rubber plug are of 20 gauge copper insulated with nylon. After the cap is loaded and the plug inserted, three peripheral crimps are made in the shell wall to seal in the plug.

(B) To test for static resistance, the lead wires of the thus assembled caps are twisted together and connected to the high voltage terminal leg-to-shell static sensitivity apparatus consisting essentially of a source of variable voltage and a series of micromicrofarad ($\mu\mu$fd.) condensers ranging in capacitance from 250–2000 $\mu\mu$fd.; the shell of the cap is connected to a ground line. Voltages of from 0 to 30,000 volts are applied to a condenser of known capacitance in increments of 1000 volts and the condenser is allowed to discharge through the cap. The caps detonate near the upper limit of the equipment, e.g., when a voltage of 30,000 volts is applied through a 1000 $\mu\mu$fd. condenser.

In contrast, caps containing lead styphnate as the ignition charge customarily detonate when a potential of 4000 volts is applied through a 2000 $\mu\mu$fd. condenser, i.e., the static resistance of lead styphnate is only about ⅐ of the static resistance of $Cs_2B_{12}H_{12} \cdot CsNO_3$.

(C) When caps prepared as described in Part A are connected to a conventional blasting circuit, ignition occurs within 28.9 milliseconds with passage of a 5 ampere (6.85 volts) firing current through the bridge wire of each cap.

(D) When the double salt, $Cs_2B_{12}H_{12} \cdot CsNO_3$, is tested for sensitivity to impact in the standard "5-kg. drop test," the composition does not detonate until the 5-kg. weight is dropped on it from a height of 45 inches.

In contrast, ignition compositions containing conventional agents, e.g., lead styphnate and mercury fulminate, detonate when a 2-kg. weight is dropped on them from heights of 3 and 2 inches, respectively.

(E) Squibs are prepared using the double salt, $$Cs_2B_{12}H_{12} \cdot CsNO_3$$

The shell and plug assembly including the bridge wire is identical to that described for the electric blasting cap, the only difference being that the detonating base charges and the priming charges are omitted and the charge weight for the double salt is increased to 3 grains. With a 5 ampere current the squibs functioned in an average time of 29.8 milliseconds. Black powder and a number of rocket propellant compositions are ignited by means of these squibs; in all cases the functioning is satisfactory.

Example II illustrates the usefulness of the compound as a component of electric blasting caps. The examples further illustrate the stability of the compound against premature detonation and explosion.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A double salt of the formula $$Cs_2B_{12}H_{12} \cdot CsNO_3$$

2. A process for the formation of $Cs_2B_{12}H_{12} \cdot CsNO_3$ which comprises bringing together the following reactants:

(1) a compound of the formula $M'_2B_{12}H_{12}$ wherein $M'$ is a cation selected from the class consisting of hydrogen, ammonium, alkali metal, and N-substituted ammonium in which the substituents are hydrocarbon of 1–8 carbon atoms, (2) a compound of the formula $M''NO_3$ wherein $M''$ is a cation selected from the class consisting of hydrogen and alkali metal, and (3) a cesium salt selected from the class consisting of cesium halide, cesium carbonate, cesium sulfate, cesium phosphate, cesium hydroxide, cesium dodecahydrododecaborate and cesium nitrate, in a solvent inert to the reactants, and isolating the resulting product.

3. Process of claim 2 wherein the solvent is water.

4. Process of claim 2 wherein the mole ratio of the nitrate compound to dodecahydrododecaborate compound is at least 3.

No references cited.

MAURICE A. BRINDISI, *Primary Examiner.*

CARL D. QUARFORTH, *Examiner.*